United States Patent
Matsumoto et al.

(10) Patent No.: US 9,906,805 B2
(45) Date of Patent: Feb. 27, 2018

(54) IMAGE PROCESSING DEVICE AND SEMICONDUCTOR DEVICE

(71) Applicant: Renesas Electronics Corporation, Koutou-ku, Tokyo (JP)

(72) Inventors: Keisuke Matsumoto, Tokyo (JP); Katsushige Matsubara, Tokyo (JP); Seiji Mochizuki, Tokyo (JP); Toshiyuki Kaya, Tokyo (JP); Hiroshi Ueda, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 239 days.

(21) Appl. No.: 14/970,603

(22) Filed: Dec. 16, 2015

(65) Prior Publication Data

US 2016/0227236 A1    Aug. 4, 2016

(30) Foreign Application Priority Data

Jan. 30, 2015 (JP) ................................. 2015-016372

(51) Int. Cl.
*H04N 19/423* (2014.01)
*H04N 19/127* (2014.01)
(Continued)

(52) U.S. Cl.
CPC ......... *H04N 19/423* (2014.11); *H04N 19/127* (2014.11); *H04N 19/136* (2014.11); (Continued)

(58) Field of Classification Search
CPC .... H04N 19/136; H04N 19/423; H04N 19/44; H04N 19/51; H04N 19/593; H04N 19/65; H04N 19/139; H04N 19/159; H04N 19/176; H04N 19/172; H04N 19/127; H04N 19/433
See application file for complete search history.

(56) References Cited

U.S. PATENT DOCUMENTS 5,822,760 A * 10/1998 Yoshizawa .......... G06F 12/0862
                                                   711/129
7,694,078 B2 * 4/2010 Setheraman ......... H04N 19/433
                                                   711/133
(Continued)

FOREIGN PATENT DOCUMENTS

JP      1999-215509 A    8/1999
JP      2010-146205 A    7/2010
WO      WO 2005/034516 A1  4/2005

OTHER PUBLICATIONS

Extended European search report for European Patent Application No. 16152893.0, dated Apr. 25, 2016.

*Primary Examiner* — Neil Mikeska
(74) *Attorney, Agent, or Firm* — Shaprio, Gabor and Rosenberger, PLLC

(57) ABSTRACT

In an image processing device, a motion image decoding processing unit extracts a feature amount of a target image to be decoded from an input stream, and changes a read size of a cache fill from an external memory to a cache memory, based on the feature amount. The feature amount represents an intra macro block ratio in, for example, one picture (frames or fields), or a motion vector variation. When the intra macro block ratio is high, the read size of the cache fill is decreased.

20 Claims, 9 Drawing Sheets

(51) Int. Cl.
    *H04N 19/136*    (2014.01)
    *H04N 19/176*    (2014.01)
    *H04N 19/44*     (2014.01)
    *H04N 19/51*     (2014.01)
    *H04N 19/593*    (2014.01)
    *H04N 19/65*     (2014.01)
    *H04N 19/139*    (2014.01)
    *H04N 19/159*    (2014.01)
    *H04N 19/172*    (2014.01)
    *H04N 19/433*    (2014.01)

(52) U.S. Cl.
    CPC ......... *H04N 19/139* (2014.11); *H04N 19/159* (2014.11); *H04N 19/172* (2014.11); *H04N 19/176* (2014.11); *H04N 19/433* (2014.11); *H04N 19/44* (2014.11); *H04N 19/51* (2014.11); *H04N 19/593* (2014.11); *H04N 19/65* (2014.11)

(56) References Cited

U.S. PATENT DOCUMENTS

| | | | |
|---|---|---|---|
| 2002/0031179 A1* | 3/2002 | Rovati | H04N 19/433 375/240.16 |
| 2003/0142818 A1* | 7/2003 | Raghunathan | G06F 21/72 380/1 |
| 2008/0209127 A1* | 8/2008 | Brokenshire | G06F 9/3802 711/125 |
| 2010/0149202 A1 | 6/2010 | Yoshikawa | |
| 2011/0213932 A1 | 9/2011 | Chiba et al. | |
| 2011/0314225 A1* | 12/2011 | Nishihara | G06F 9/5088 711/119 |

* cited by examiner

IMAGE PROCESSING DEVICE AND SEMICONDUCTOR DEVICE

CROSS-REFERENCE TO RELATED APPLICATIONS

The disclosure of Japanese Patent Application No. 2015-016372 filed on Jan. 30, 2015 including the specification, drawings and abstract is incorporated herein by reference in its entirety.

BACKGROUND

The present invention relates to an image processing device and a semiconductor device, and is, more particularly and preferably applicable to a motion image decoding process including a cache memory temporarily holding a reference image.

In systems handling motion images, the enlargement of the screen size progresses, such as in 4K or Super High Vision. To hold image data of decoded pictures (specifying the display screen of frames in the case of progressive scanning or fields in the case of interlace scanning), motion image-decoding devices handling a large volume of signals include a large capacity memory. In a process for motion prediction or motion compensation in the decoding process for the motion image, image data of a preceding or following picture ahead or after a target picture to be decoded is referred to as a reference image. Thus, a high bandwidth is necessary for accessing the memory, and the power consumption or high performance causes an increase in the cost. Thus, there is demanded a technique for reducing the bandwidth, and an important technique is to reduce the bandwidth using the cache memory for performing the process for decoding the motion image to have a high resolution.

Japanese Unexamined Patent Publication No. 1999-215509 discloses a technique for reducing data cache errors in a motion compensating process included in an MPEG (Motion Picture Element Group) video expansion process executed by the software on a general processor. Given to a data cache controller is an address of an area adjacent to the right side of a reference area, specified by a motion vector in the motion compensating process, in a particular macro block, and a preload instruction is issued. Then, data of the area is preloaded from the main memory to the data cache. Note that the macro block is a unit area including a plurality of pixels (for example, an area of 16 pixels*16 pixels) as a target for the decoding process. One picture includes a plurality of macro blocks which are two-dimensionally arranged in the row direction and the column direction. The decoding process is executed for target macro blocks, sequentially from an upper left macro block of the picture to the right macro block, and further from the macro block in the lower row sequentially from left to right. The area adjacent to the right side of the reference area, specified by the motion vector in the motion compensating process in a particular macro block, has a high possibility of being a reference area specified by a motion vector even in a motion compensating process in a target macro block for the next decoding process. Thus, by preloading image data of the area, it is possible to reduce the data cache error.

Japanese Unexamined Patent Publication No. 2010-146205 discloses a technique for improving a cache hit ratio in a cache memory storing image data. Data items of the top field and the bottom field of an interlace image are formed not to be mixed together in each cache line. In the case of an interlace image with a field configuration, decoding processes are independently performed for the top field and the bottom field. Thus, if two field data items are mixed together in each cache line, even when only either field data item is necessary, both field data items are read in the cache. This decreases the cache ratio. In each cache line, either of the top field and the bottom field is stored. This does not decrease the cache ratio. The number of ways of the cache and the number of entries are changed, in accordance with the change of the pixel area in the processing units, such as MBAFF (MacroBlock=Adaptive Frame/Field) in H.264 as one standard of motion image encoding. When access granularity for image data is high, the number of ways is reduced, and wide-range data of an image is held in the cache. When the access granularity is low, the number of ways is increased, and data of a narrow-range image is switched. As a result, the cache memory is sufficiently used, and the cache hit ratio is improved.

As a result of inventors' examination on Japanese Unexamined Patent Publications No. 1999-215509 and No. 2010-146205, the following new problems have been found.

According to the technique disclosed in Japanese Unexamined Patent Publication No. 1999-215509, for target macro blocks to be sequentially decoded, if a compensating process is executed using the motion vector with the same direction and the same size, it maximizes the effect of reducing the data cache error. However, as a result of the inventors' examination, it is found that the data preloaded to the data cache memory may not be referred, depending on the features of the target stream to be decoded. The stream may include inter macro blocks or intra macro blocks in every one picture. The inter macro block is a macro block for which a decoding process is performed with a motion compensating process, with reference to a reference image specified by the motion vector included in the stream. On the other hand, the intra macro block is a macro block for which a decoding process is performed with reference to decoded image data in the target picture to be decoded, without the motion compensating process. In an encoding process for generating a stream, the encoding efficiency may be improved by adaptively switching between performing inter-prediction with the motion compensation and performing intra-prediction without the motion compensation, in association with each macro block. In this case, the stream includes inter macro blocks and intra macro blocks in each one picture. When the target macro block to be decoded is an inter macro block, and after the image data of the reference area to be referred by the motion vector is read to the data cache memory, an address of the area adjacent to the right side thereof is given to the data cache controller to be necessarily preloaded. Even in this case, a target macro block to be decoded for the next time is processed, not necessarily with reference to the preloaded image data. When the target macro block to be decoded for the next time is an intra macro block, the reference area is not necessary, because the motion compensation is not performed. Further, the data cache memory is not accessed, thus possibly causing the preloaded image data to be wasted. Even if the macro block to be decoded next is an inter macro block, when the direction or size of the motion vector remarkably differs from that of the previous macro block, it is found that there is a high possibility that the preloaded image data will be wasted, with reference to a reference area different from the reference area of the previous macro block.

With adoption of the technique disclosed in Japanese Unexamined Patent Publication No. 2010-146205, the cache configuration (the number of ways and the number of entries) is simply and only changed, based on fixed information in the picture units. Specifically, the change is made in the top and the bottom at the interlace processing or the pixel area in the processing units. Thus, it does not manage the change in the features of the stream changing in accordance with each picture, thus not improving the cache efficiency. For example, in the case of a frame including many intra macro blocks, it is found that the data read in the cache memory by cache fill is not used, that is, the reusability is decreased, thereby the cache fill causes frequent occurrence of unnecessary data read.

Accordingly, if the preloading is executed evenly independently of the features of the stream, the preloaded data may not be referred. Hence, it is found that the band of a bus is wastefully used by the data read, due to the cache fill for the data cache memory. This unnecessary data read causes an increase in the consumption power. Like the general-purpose processor disclosed in Japanese Unexamined Patent Publication No. 1999-215509, when the bus is used commonly with another functional module, the above unnecessary data read creates pressure on the band for another module. In this case, it is found that there is a possibility of deteriorating the performance of the system as a whole. As disclosed in Japanese Unexamined Patent Publication No. 2010-146205, even if the cache configuration (the number of ways and the number of entries) is changed based on the fixed information in the picture units, it does not manage the change in the features of the stream changing in accordance with each picture. Thus, it does not sufficiently contribute to the improvement of the cache efficiency, accordingly to the disclosure.

SUMMARY

Means for solving the problems will be described below. These and other objects and new features of the invention will be apparent from the description of the present specification and the accompanying drawings.

According to an embodiment, the following may apply.

That is, there is provided an image processing device including a motion image decoding processing unit to which a stream is input and a cache memory couplable to an external memory. In the device, the motion mage decoding processing unit extracts a feature amount of a target image to be decoded from the input stream, and changes a read size of a cache fill from the external memory to the cache memory based on the feature amount.

The effect acquired by the embodiment will briefly be described as follows.

That is, when the motion image decoding processing unit reads the reference image stored in the external memory through the cache memory, it is possible to reduce the unnecessary cache fill for the cache memory and to improve the utilization efficiency of the cache memory.

DETAILED DESCRIPTION

Descriptions will now specifically be made to embodiments of the present invention.

First Embodiment

<Change Cache Configuration Based on Ratio of Intra Macro Blocks>

Figure 1:
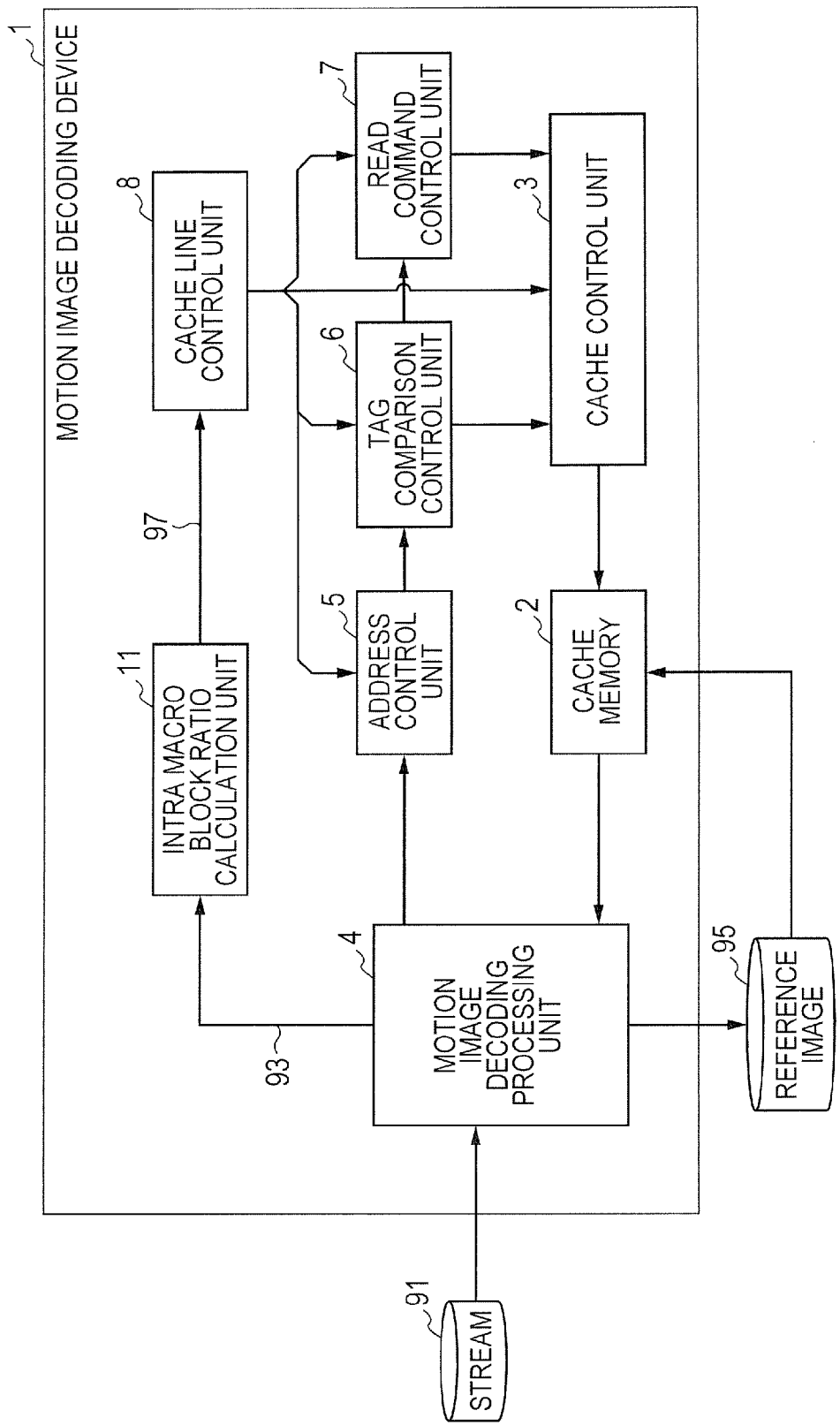
FIG. 1 is a block diagram illustrating a configuration example of a motion image decoding device of a first embodiment.

FIG. 1 is a block diagram illustrating a configuration example of a motion image decoding device of the first embodiment. A motion image decoding device 1 is configured to include a motion image decoding processing unit 4, a cache memory 2, a cache control unit 3, an address control unit 5, a tag comparison control unit 6, a read command control unit 7, a cache line control unit 8, and an intra macro block ratio calculation unit 11. The motion image decoding processing unit 4 reads a stream 91, and performs a process for decoding a motion image thereof. Those illustrated arrows for coupling between functional blocks represent the flow of signals implemented by a single wiring or a plurality of wirings, and do not represent a bus indicating a plurality of wirings. This point may also apply to other block diagrams of the present application.

Though not particularly limited, for example, the motion image is encoded in accordance with the standard, such as H.264. The stream 91 includes binary codes generated by an encoring process and encoding information 92 used for the encoding process. The motion image is configured with time series pictures (specifying a display screen of frames in the case of progressive scanning or fields in the case of interlace scanning). Each picture is configured with a plurality of macro blocks which are two-dimensionally arranged in the row direction and the column direction. The macro block includes areas in the unit of the encoding process and the decoding process, for example, 16 pixels*16 pixels. The process for encoding the motion image employs intra prediction and inter prediction. The intra prediction includes prediction encoding with reference to image data in the same picture where a target macro block to be encoded is arranged, while the inter prediction includes prediction encoding with reference to image data of a picture different from that where the target macro block to be encoded is arranged. Selection of whether the intra prediction or the inter prediction is used is made for each macro block, and information 93 representing which prediction is used is included in the encoding information 92 of the stream 91.

When the inter prediction is used, a motion vector (MV) in the encoding process is obtained, and motion vector information (MV information) 94 regarding the obtained vector is included also in the encoding information 92. The process for encoding the motion image may further include a quantization process or a variable length encoding process. At this time, the encoding information 92 includes variable length information regarding quantization parameters or variable length codes.

The motion image decoding processing unit 4 performs a process for decoding the read stream 91, and outputs a decoded image to an external memory 60 (not illustrated). When a target macro block to be decoded is a macro block (called as an inter macro block) which has been encoded using the inter prediction, the motion image decoding processing unit 4 reads and refers a part of the decoded and output image from the external memory 60 to the cache memory 2 in the decoding process, as a reference image 95. An address of the stored reference image 95 to be referred is supplied to the tag comparison control unit 6 as a request address from the motion image decoding processing unit 4 through the address control unit 5. The tag comparison control unit 6 includes a tag memory (not illustrated), compares the request address with tag data held in the tag memory, and determines whether a cache hit or error has occurred. The determination result is supplied to the read command control unit 7 and the cache control unit 3. When a cache hit has occurred, the cache control unit 3 reads data corresponding to the request address from the cache memory 2, and supplies it to the motion image decoding processing unit 4. When a cache error has occurred, the cache control unit 3 performs cache fill for data with the read size specified by the read command control unit 7, in the cache memory 2.

The intra macro block ratio calculation unit 11 receives the intra/inter macro block information 93 supplied from the motion image decoding processing unit 4. The intra/inter macro block information 93 is included in the encoding information 92 in the input stream 91 and represents whether the intra prediction or inter prediction has been used in the process for encoding the macro block. The intra macro block ratio calculation unit 11 calculates an intra macro block ratio 97, and supplies it to the cache line control unit 8. The cache line control unit 8 controls addresses in the address control unit 5, controls the configuration, the tag size, and the entry size of the tag memory in the tag comparison control unit 6, and controls the line size in the read command control unit 7 and the cache control unit 3 and the read size at the time of cache fill, based on the macro block ratio 97.

Descriptions will now be made to operations of the motion image decoding device 1 of the first embodiment. The motion image decoding processing unit 4 outputs the intra/inter macro block information 93 obtained in the process for decoding the input stream 91, to the intra macro block ratio calculation unit 11. The intra macro block ratio calculation unit 11 calculates the intra macro block ratio 97 of the entire macro blocks in one picture, based on the intra/inter macro block information 93. The cache line control unit 8 changes the cache line size and the number of entries of the cache memory 2 storing the reference image to be referred at the inter prediction, in accordance with the intra macro block ratio 97 supplied from the intra macro block ratio calculation unit 11.

Figure 2:
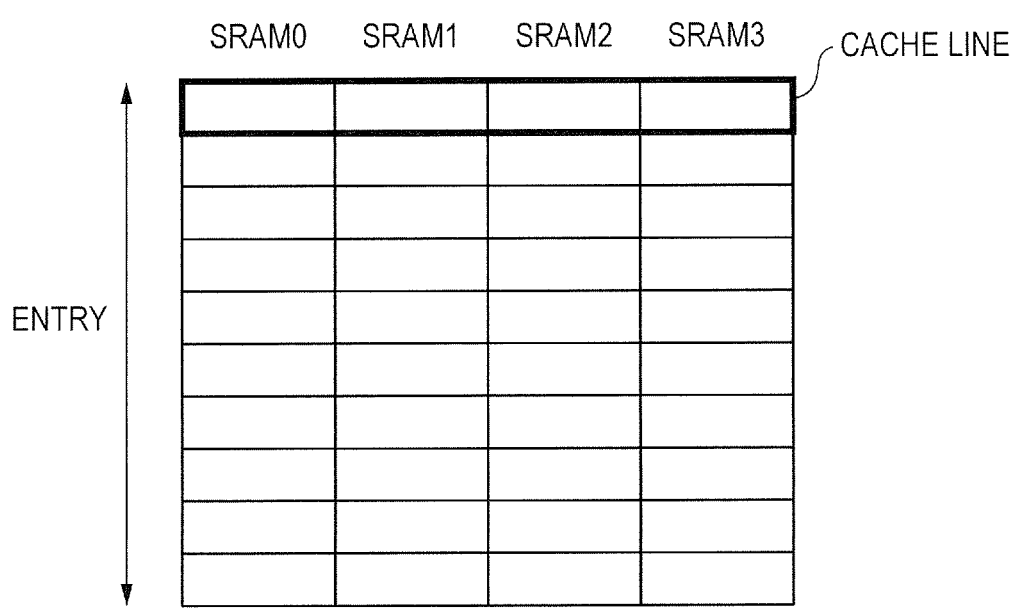
FIG. 2 is an explanatory diagram illustrating a cache memory when the ratio of the intra macro blocks is low.
Figure 3:
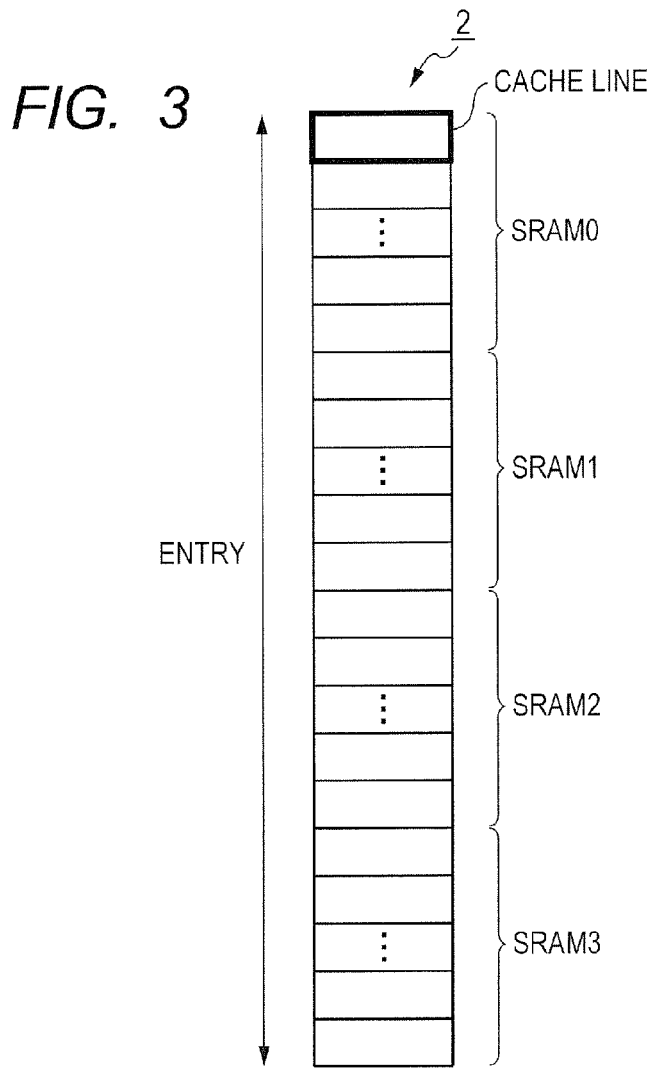
FIG. 3 is an explanatory diagram illustrating a cache memory when the ratio of the intra macro blocks is high.

FIG. 2 and FIG. 3 are explanatory diagrams for explaining configuration examples of the cache memory. FIG. 2 illustrates a case where the intra macro block ratio 97 is low, while FIG. 3 illustrates a case where the ratio 97 is high.

Each of the drawings illustrates an example in which the cache memory 2 is configured with four SRAMs (Static Random Access Memory) SRAM0 to SRAM4. As illustrated in FIG. 2, when the intra macro block ratio 97 is low, the SRAM0 to SRAM4 are configured to be parallelly accessed, the cache line size is increased, and the number of entries is made small. As illustrated in FIG. 3, when the intra macro block ratio 97 is high, the SRAM0 to SRAM4 are configured to be individually accessed, the cache line size is decreased, and the number of entries is made large.

The address control unit 5 converts an address of a reference image requested from the motion image decoding processing unit 4, in accordance with the cache line size and the number of entries specified by the cache line control unit 8. The motion image decoding processing unit 4 issues, for example, a read command specifying the stored reference image to be referred.

Figure 4:
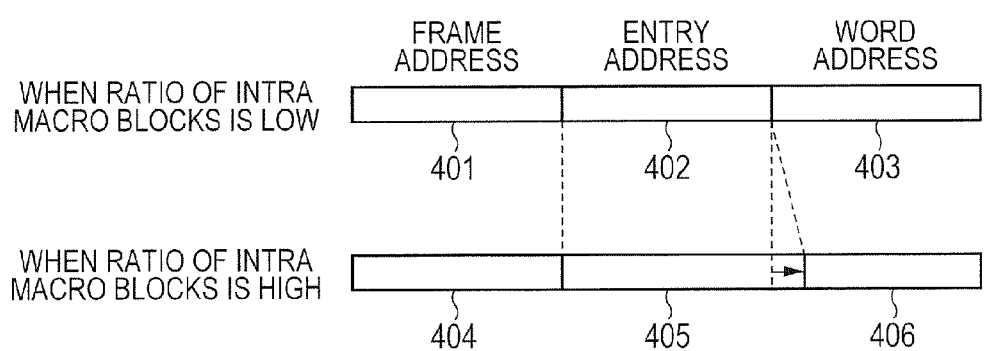
FIG. 4 is an explanatory diagram of an address conversion process in an address control unit.

FIG. 4 is an explanatory diagram for an address conversion process in the address control unit 5.

When the intra block ratio is low, as shown in the upper row, the address conversion unit 5 divides the address of the reference image read command input from the motion image decoding processing unit 4, into a frame address 401, an entry address 402, and a word address 403, sequentially from the upper bits. The frame address 401 is used for comparison with the tag. The entry address 402 is used for selecting the cache line in the cache memory 2. The word address 403 is used for selecting data in the cache line.

When the intra macro block ratio is high, as described in the lower row, the division of the read address by the address control unit 5 is made into 404, 405, and 406 this time. As compared to the case where the intra macro block ratio is low, the word address 406 is made narrow, and the entry address 405 is made wide.

Though not illustrated in FIG. 1, the tag comparison control unit 6 is configured with a tag memory, compares a request address for specifying a requested read image based on the reference image read command from the address control unit 5 with the tag data held in the tag memory, and determines whether a cache hit or a cache error has occurred. At this time, the tag comparison control unit 6 changes the configuration of the tag memory, in accordance with the number of entries instructed from the cache line control unit 8, compares the addresses 401 and 403 input from the address control unit 5 with the tags selected using the addresses 402 and 404, and determines whether a cache hit or a cache error has occurred.

When the tag comparison control unit 6 has determined that the cache error has occurred, the read command control unit 7 determines a data size of data to be read to the cache memory 2 in accordance with a cache line size specified from the cache line control unit 8, and generates a read command.

The cache control unit 3 controls the configuration of the cache as illustrated in FIG. 2 and FIG. 3, in accordance with the number of entries specified from the cache line control unit 8, reads data represented by the entry address and the word address output from the tag comparison control unit 6, and transfers it to the motion image decoding processing unit 4.

When the cache error has occurred, the read command generated by the read command control unit 7 is issued to an external memory, and performs a read process of the reference image 95.

As described above, when the intra macro block ratio 97 is high, the cache line size is decreased. This enables to reduce a data transfer amount of an unnecessary reference image to be read and not to be referred at the time of cache error, reduce the consumption power, and improve the system performance. On the contrary, when the intra macro block ratio 97 is low, the cache line size is increased. This enables to preload the image with a high possibility of being referred in the future and high reusability in the cache 2 in advance, and improve the utilization efficiency of the cache memory.

In a picture with a high ratio of macro blocks for intra prediction, the accessing frequency for the reference image by the motion image decoding processing unit is low. By decreasing the line size of the cache memory, it will be possible to suppress unnecessary filling of the cache. That is, the unnecessary filling of the cache has a high possibility of causing the cache error in the decoding process for the following target macro blocks. At this time, the cache memory is configured to cache many entries, thus improving the hit ratio of the entire picture. On the contrary, in a picture with a low ratio of macro blocks for intra prediction, the accessing frequency for the reference image by the motion image decoding processing unit is high. By increasing the line size of the cache memory, it will be possible to improve the hit ratio of the cache memory in the decoding process for the following target macro blocks.

In the first embodiment, as described above, the intra macro block ratio 97 is calculated in association with each picture. With this calculation, a change is made in the configuration of the tag comparison control unit 6 including the cache memory 2 and the tag memory, in association with each picture, thereby changing the configuration of the cache. However, the control units are not limited to the picture units. For example, the ratios of the intra macro blocks are extracted over a plurality of pictures. When there is a remarkable difference therebetween, the configuration of the cache may be changed. This results in reducing the frequency of changing the configuration of the cache, thus suppressing sensitive reactions. One picture is divided into a plurality of areas, the ratio of the intra macro blocks is extracted in association with the divided areas, and the configuration of the cache may be changed in association with the areas. As a result, the configuration of the cache is adaptively changed precisely in accordance with the features of the areas of the target image to be decoded, thus improving the utilization efficiency of the cache memory. For example, decoding may be performed for an image with an object which randomly moves in a fixed background. In this case, the background has a high correlation between pictures, thus the inter prediction is likely to be adopted therefore. On the other hand, the area with the moving object has a low correction between the pictures, thus the intra prediction is likely to be adopted therefore. In the cases, the configuration of the cache is optimized, thus the intra prediction is often likely to be adopted therefore. In the area with the moving object, the cache line size is decreased, thus suppressing the occurrence of unnecessary filling of the cache. On the other hand, in the background area where the inter prediction is assumed to be adopted, the cache line size is increased, thus expectedly improving the hit ratio.

In the example of the first embodiment, with reference to FIG. 2 and FIG. 3, the cache memory 2 is configured with the four SDRAMs. This is simply an example, and the configuration (including the number of the SDRAMS) of the cache memory 2 and the configuration of the tag comparison control unit 6 are arbitrary.

Second Embodiment

<Change Cache Configuration Based on Variation of Motion Vectors (MV)>

Figure 5:
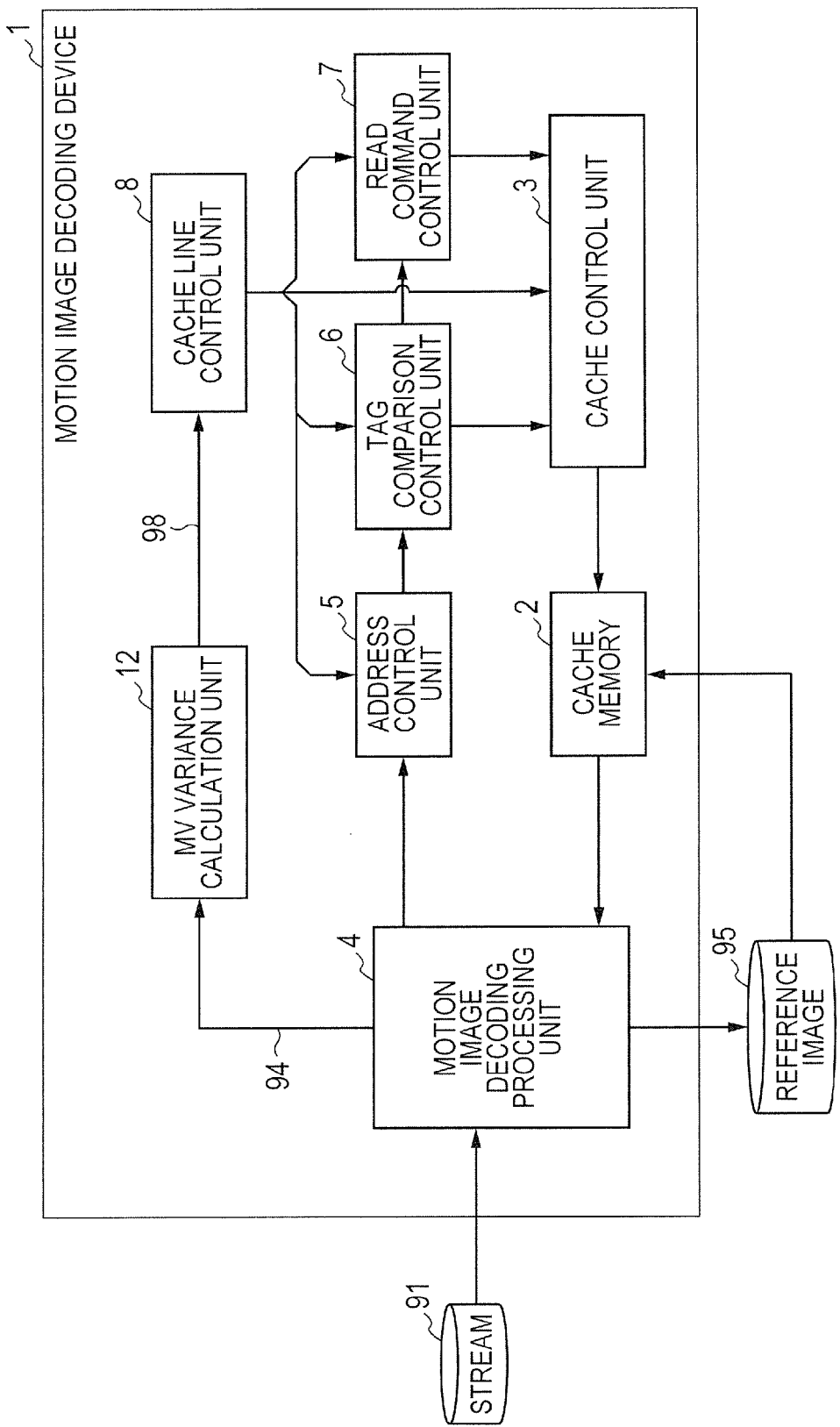
FIG. 5 is a block diagram illustrating a configuration example of a motion image decoding device of a second embodiment.

FIG. 5 is a block diagram illustrating a configuration example of a motion image decoding device of a second embodiment. Like the motion image decoding device of the first embodiment illustrated in FIG. 1, the motion image decoding device 1 includes a motion image decoding processing unit 4, a cache memory 2, a cache control unit 3, an address control unit 5, a tag comparison control unit 6, a read command control unit 7, a cache line control unit 8, and also an MV variance calculation unit 12 in place of the intra macro block ratio calculation unit 11. The term "MV" of the MV variance calculation unit 12 stands for Motion Vector, and represents one encoding information (MV information 94) corresponding to macro blocks with the adopted inter prediction for encoding.

The MV variance calculation unit 12 receives the MV information 94 supplied from the motion image decoding processing unit 4. The MV information 94 is included in encoding information 92 in an input stream 91, and represents a motion vector (MV) when inter prediction is applied in an encoding process for the macro blocks. The MV variance calculation unit 12 calculates a variation of motion vectors (MV variation) 98, and supplies it to the cache line control unit 8. The cache line control unit 8 controls addresses in the address control unit 5, controls the configuration, the tag size, and the entry size of the tag memory in the tag comparison control unit 6, and controls the line size in the read command control unit 7 and the cache control unit 3 and the read size at the time of cache fill, based on the MV variation 98. The configuration and operations other than the MV variance calculation unit 12 are the same as those of the motion image decoding device of the first embodiment, thus will not repeatedly be specifically described.

Descriptions will now be made to operation of the motion image decoding device 1 of the second embodiment. The motion image decoding processing unit 4 outputs the MV information 94 obtained in the process of decoding the input stream 91, to the MV variance calculation unit 12. The MV variance calculation unit 12 calculates the MV variation 98 within one picture, based on the input MV information 94. The cache line control unit 8 changes the cache line size and the number of entries of the cache storing the reference image to be referred at the prediction of display screens, in accordance with the MV variation 98 supplied from the MV variance calculation unit 12. The cache memory 2 has the same configuration as that of the cache memory 2 of the first embodiment that has been described with reference to FIG. 2 and FIG. 3, and operates the same.

Figure 6:
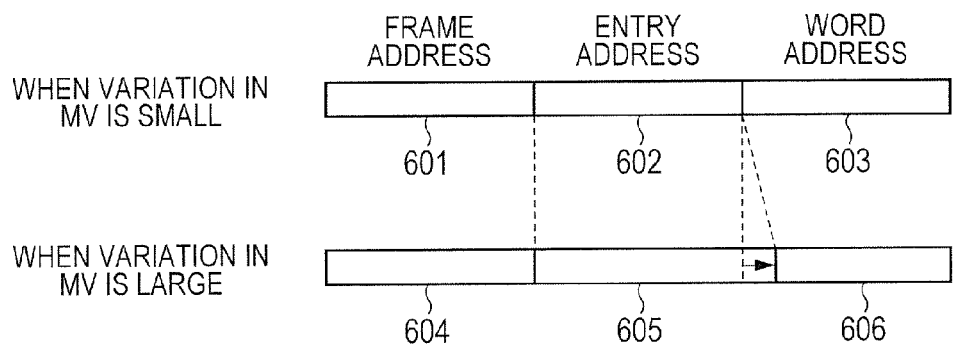
FIG. 6 is an explanatory diagram of an address conversion process in an address control unit of the second embodiment.

FIG. 6 is an explanatory diagram of an address conversion process in the address control unit of the second embodiment.

As shown in the upper row, when the variation of the MV is small, the address control unit 5 divides an address of a reference image read command input from the motion image decoding processing unit 4, into a frame address 601, an entry address 602, and a word address 603, sequentially from the upper bits. The frame address 601 is used for comparison with the tag. The entry address 602 is used for selecting the cache line in the cache memory 2. The word address 603 is used for selecting data in the cache line.

As shown in the lower row, when the variation of the MV is large, the division of the read address of the address control unit 5 is made into 604, 605, and 606 this time. As compared with the case where the ratio of the intra macro blocks is low, the word address 606 is made narrow, and the entry address 605 is made wide.

The tag comparison control unit 6, the read command control unit 7, and the cache control unit 3 operate similarly to those of the first embodiment, in accordance with the cache line size and the number of entries instructed from the cache line control unit 8.

When the MV variation 98 is large, the cache line size is made small, thereby enabling to reduce the data transfer amount of the unnecessary reference image 95 to be read and not to be referred at the time of cache error. This results in reducing the consumption power and improving the system performance. When the MV variation 98 is small, the cache line size is made large, thereby preloading the reference image 95 with a high possibility of being referred in the future and high reusability, to the cache memory 2 in advance. This results in improving the efficiency of the cache memory.

Additional descriptions will now be made to the principles of producing the effects.

Though in an extreme case, let it be assumed that motion prediction is performed for the entire macro blocks in the picture using the motion vector having the same direction and the same size. In the case, when the cache error has occurred at the time of reading the reference image in the decoding of a particular macro block, it is efficient that the cache is filled also together with a reference image adjacent to the corresponding reference image, because a cache hit occurs. This is because the motion prediction is performed using the motion vector with the same direction and the same size also in the following macro blocks, the reference image to be accessed also follows the reference image accessed in the previous decoding process, and is read in advance in the cache memory by performing the cache fill. Accordingly, even if the motion vectors do not have the same direction and the same size, as long as their variation is small, the reference image to be accessed in the decoding process for the following macro blocks is to exist near the reference image to be accessed in the decoding process executed at this point. Thus, there is a high possibility of improving the hit ratio by increasing the read size of the cache fill. On the contrary, if the variation is large, the reference image to be accessed in the decoding process for the following macro blocks has a low possibility that it exists near the reference image to be accessed in the decoding process executed at this point. Thus, if the read size of the cache fill is increased, there is a high possibility of causing a cache error, resulting in unnecessary filling of the cache. Therefore, the read size is decreased to suppress unnecessary filling of the cache.

In the second embodiment, the MV variation 98 is calculated in association with each picture, and the configuration of the tag comparison control unit 6 including the cache memory 2 and the tag memory is changed in association with the picture, in accordance with the calculation, thereby successfully changing the configuration of the cache. In this example, the control units are not limited to the picture unit. For example, the MV variation is extracted over a plurality of pictures. When the variation size remarkably changes, the configuration of the cache may possibly be changed. This results in reducing the frequency of changing the configuration of the cache. In the other case, one picture may be divided into a plurality of areas, the MV variation is extracted in association with each area, and the configuration of the cache may be changed in association with each area.

As a result, the configuration of the cache is adaptively changed precisely in accordance with the features of a target image to be decoded, thus improving the utilization efficiency of the cache memory. For example, when to decode an image with a fixed background taken by a panning camera (turning) and having a randomly moving object therein, the MVs in the background have substantially the same direction and size. In this case, the MV variation is hardly expressed. In the area with the moving object, the MV variation is large. In this case, if the configuration of the cache is optimized in association with each area, in the area with the large MV variation and with the moving object, the line size of the cache is decreased, thereby suppressing the occurrence of unnecessary filling of the cache. In the background area where the MV variation is small, the line size of the cache is increased, thereby expectedly improving the hit ratio.

It is preferred to make an embodiment in combination of this second embodiment and the above-described first embodiment. That is, the ratio of intra macro blocks is calculated, in association with one picture, in the unit of a plurality of pictures, or in association with each area of one picture. When this ratio is low, that is, when the ratio of the inter macro blocks is high, the MV variation is further referred to control the configuration of the cache. This enables to adopt the configuration of the cache which is suitable further precisely for the features of the image to be decoded, thus possibly improving the utilization efficiency of the cache memory.

Figure 7:
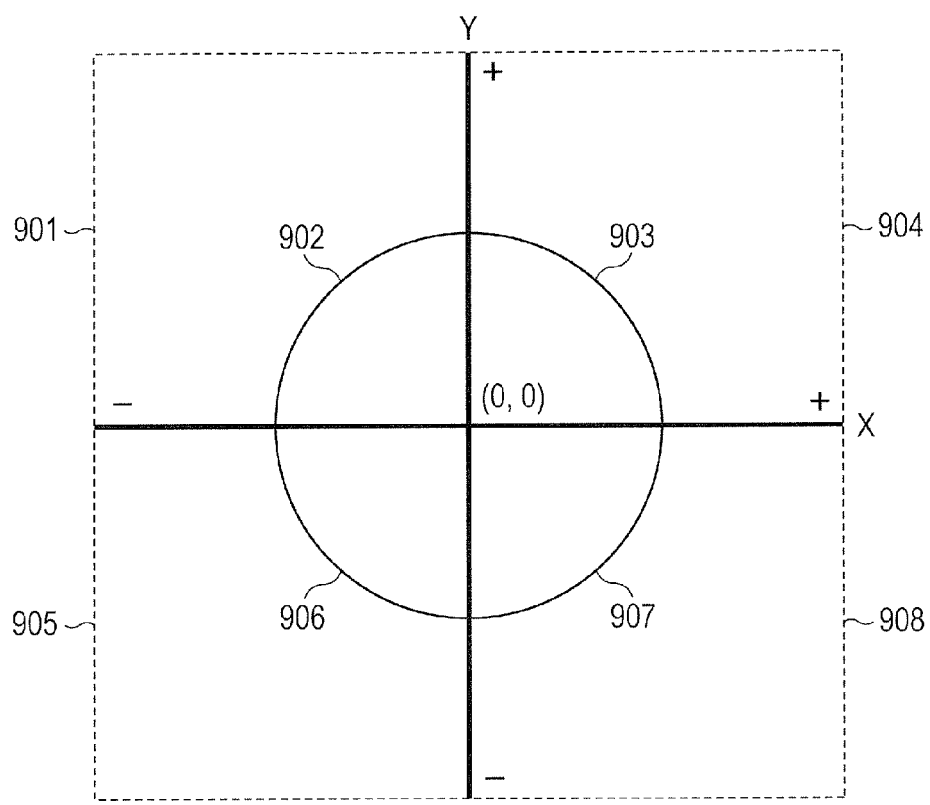
FIG. 7 is an explanatory diagram illustrating an example of a motion vector variance calculation process.

FIG. 7 is an explanatory diagram for explaining an example of a motion vector variance calculation process. Various algorithms are possibly adopted for calculating the MV variation 98 in the MV variance calculation unit 12 in the second embodiment. In this embodiment, one example thereof will now be described.

An MV is a two-dimensional vector having a direction and a size. An area specified by the MV is illustrated in FIG. 7. In the MV variance calculation unit 12, the area in the reference image specified by the MV is divided into eight areas of 901 to 908. The areas 903, 907, 906, and 902 are respectively quadrant areas (a first quadrant, a second quadrant, a third quadrant, and a fourth quadrant) specified by the MVs with a size equal to or lower than a predetermined value. The areas 904, 908, 905, and 901 are respectively quadrant areas (a first quadrant, a second quadrant, a third quadrant, and a fourth quadrant) specified by the MVs with a size equal to or greater than the predetermined value. The number of MVs specifying the areas is counted in association with each area, and the variation is derived from the counted value and the total number of MVs in the picture. For example, when ¼ of the total number of MVs is assumed as a threshold value, if the number of MVs in the entire eight areas does not exceed the value, it is determined that the MV variation is large.

As a result, the variation of the motion vectors can easily be calculated without using a complicated arithmetic operation, such as multiplication.

Third Embodiment

<Extract Feature Amount of Current Picture from Result of Variable Length Encoding Process>

Figure 8:
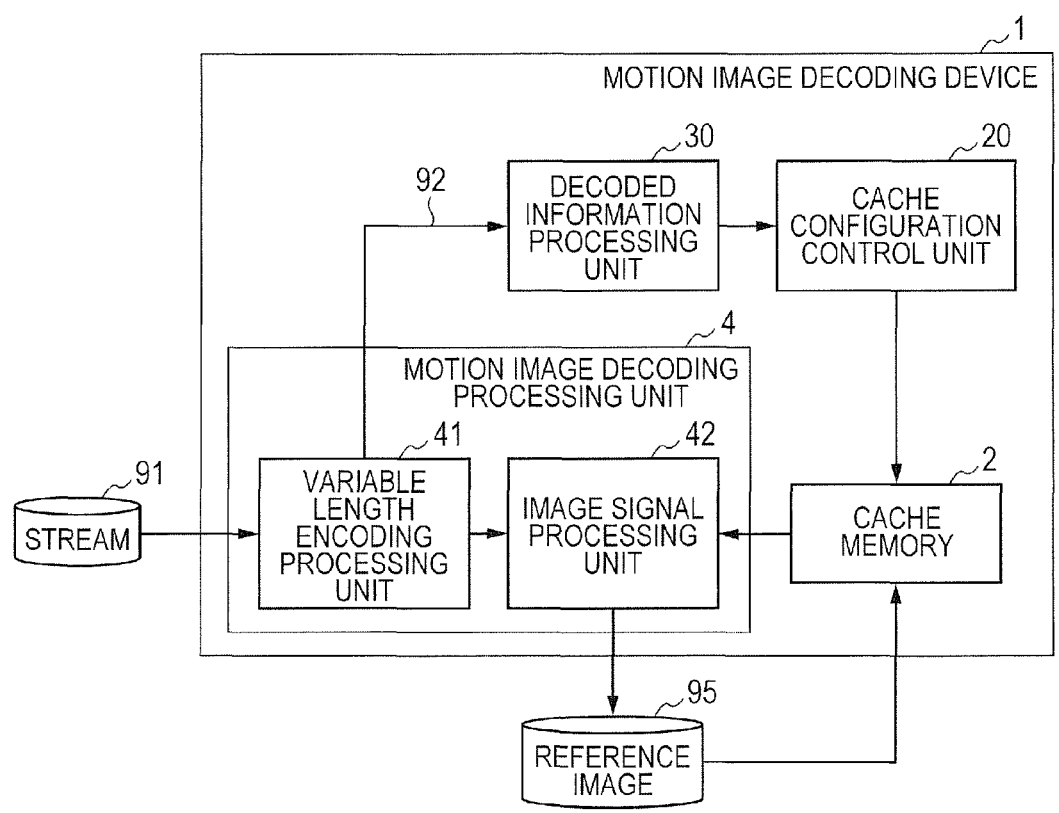
FIG. 8 is a block diagram illustrating a configuration example of a motion image decoding device of a third embodiment.

FIG. 8 is a block diagram illustrating a configuration example of a motion image decoding device of a third embodiment. A motion image decoding device 1 is configured to include a motion image decoding processing unit 4, a cache memory 2, a decoding information processing unit 30, and a cache configuration control unit 20. The cache control configuration unit 20 includes the intra macro block ratio calculation unit 11 of the first embodiment, the MV variance calculation unit 12 of the second embodiment, or another to-be-decoded image analyzing unit. It is configured further with a cache line control unit 8, an address control unit 5, a tag comparison control unit 6, a read command control unit 7, and a cache control unit 3. The motion image decoding processing unit 4 is configured with a variable length encoding processing unit 41 performing a decoding process for variable length codes and an image signal processing unit 42 performing a decoding process for image signals. The decoding information processing unit 30 extracts encoding information 92 of intra macro block information 93 or MV information 94 from a decoded result of the variable length code by the variable length encoding processing unit 41, and outputs it to the cache configuration control unit 20.

Descriptions will now be made to operations of the motion image decoding device 1 of the third embodiment. The variable length encoding processing unit 41 executes a decoding process for variable length codes in the unit of each picture, for an input stream. The image signal processing unit 42 performs a signal process for variable length code decoded data output from the variable length encoding processing unit 41, and decodes it into an image. This decoding process is executed in a manner delayed from the variable length encoding processing unit 41 by one picture. That is, the variable length encoding processing unit 41 and the image signal processing unit 42 are configured with a pipeline including steps corresponding to pictures in one-to-one relationship.

The decoding information processing unit 30 outputs the encoding information 92, such as the intra macro block information or the MV information 94, of the same picture as that processed by the variable length encoding processing unit 41, to the cache configuration control unit 20. Thus, the cache configuration control unit 20 can receive information regarding the picture to be processed next by the image signal processing unit 42. At the time the image signal processing unit 42 processes the next picture, the cache configuration control unit 20 can appropriately change the configuration of the cache using the encoding information 92, such as the intra macro block information 93 or the MV information 94, of the same picture. According to this pipeline configuration, it is possible to prepare, at the same time, the target picture to be processed in the image signal process and the picture for providing the encoding information 92, such as the intra macro block information 93 or the MV information 94, used for specifying the configuration of the cache at this time. Therefore, the configuration of the cache is suitably adapted by the pictures.

As a result, the configuration of the cache memory, such as the line size or the entry size, is dynamically controlled based on the feature amount extracted from the picture itself processed by the image signal processing unit, thereby improving the utilization efficiency of the cache memory. When the decoding process is performed with one unit without being separately performed by the variable length encoding processing unit and the image signal processing unit, the feature amount of one picture is extracted upon completion of the decoding process of the corresponding picture. Thus, the earliest case of changing the configuration of the cache memory based on the extracted feature amount is performed at the time the decoding process for the next picture is executed. In the other case, the pipeline configuration in the unit of one picture unit is formed with the variable length encoding processing unit and the image signal processing unit, and the feature amount is extracted from the result of the variable length encoded result. In this case, in the image signal process executed at the next pipeline stage, the configuration of the cache memory can be specified based on the feature amount of the target picture itself to be decoded at this time, thereby enabling to appropriately perform the controlling.

Fourth Embodiment

<Extract Feature Amount of Current Picture from Encoding Information Input Parallelly to Stream>

Figure 9:
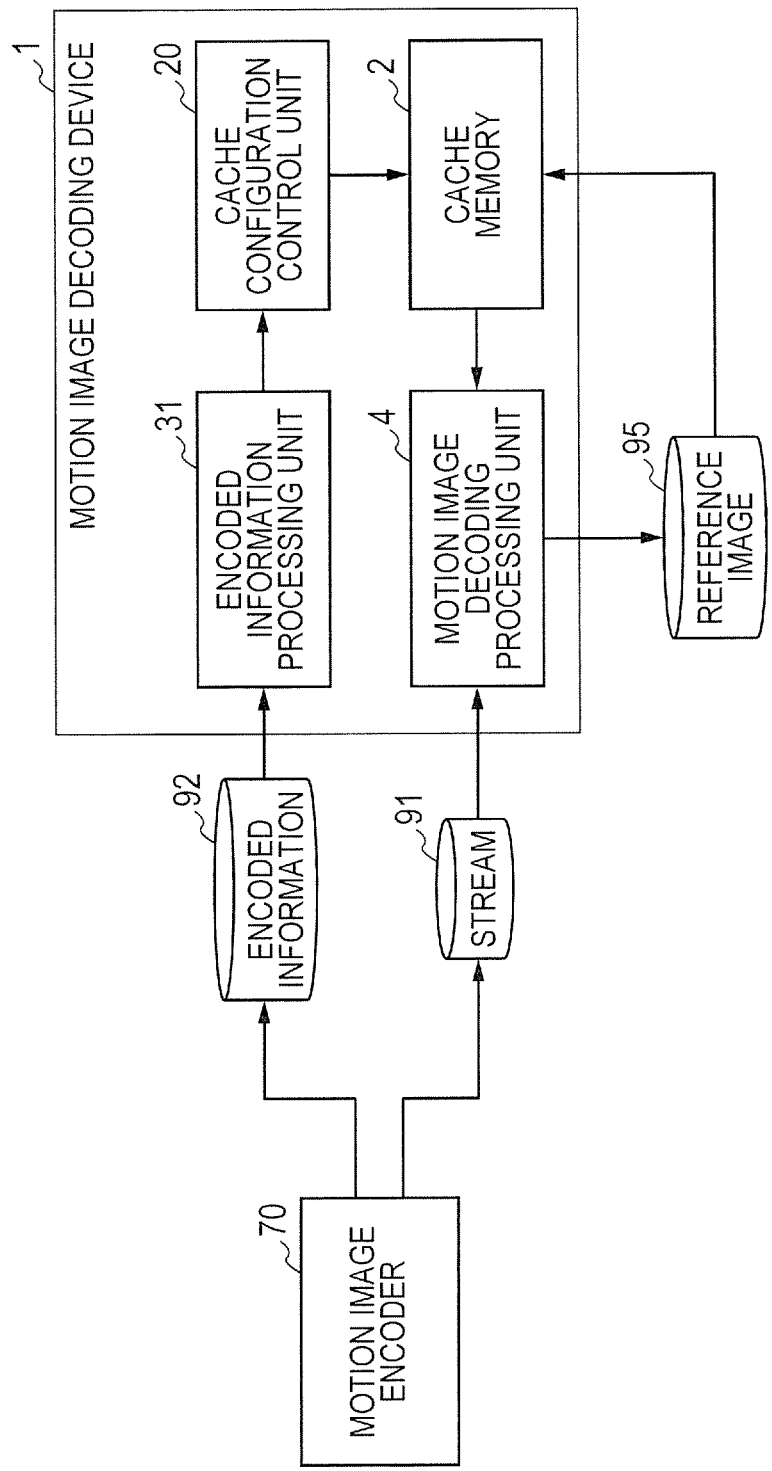
FIG. 9 is a block diagram illustrating a configuration example of a motion image processing device of a fourth embodiment.

FIG. 9 is a block diagram illustrating a configuration example of a motion image processing device of a fourth embodiment. A motion image decoding device 1 is configured with a motion image decoding processing unit 4, a cache memory 2, an encoding information processing unit 31, and a cache configuration control unit 20. The cache configuration control unit 20 includes the intra macro block ratio calculation unit 11 of the first embodiment, the MV variance calculation unit 12 of the second embodiment, or another to-be-decoded image analyzing unit. It is configured further with a cache line control unit 8, an address control unit 5, a tag comparison control unit 6, a read command control unit 7, and a cache control unit 3. The motion image decoding device 1 receives a stream 91 together with encoding information 92 parallelly input thereto, for example, from an external or installed motion image encoding unit 70. In this case, the encoding information 92 is information of the time the motion image encoding unit 70 performs an encoding process for an original image, and includes intra/inter macro block information 93, MV information 94, and further code length information, such as quantization parameters or variable length codes, as described in the first embodiment. Normally, the encoding information 92 is included in the stream 91. However, in this embodiment, the information 92 is supplied to the encoding information processing unit 31 in the motion image decoding device 1, in parallel thereto. That is, the stream 91 is input to the motion image decoding processing unit 4, and corresponding encoding information 92 is input to the encoding information processing unit 31 in parallel thereto.

Descriptions will now be made to operations of the motion image decoding device 1 of the fourth embodiment.

The motion image encoding unit 70 supplies the stream 91 to the motion image decoding processing unit 4 inside the motion image decoding device 1, and supplies the encoding information 92 generated by an encoding process for this stream 91 to the encoding information processing unit 31, in parallel thereto. The encoding information processing unit 31 extracts information required by the cache configuration control unit 20 (for example, the intra/inter macro block information 93 or the MV information 94) from the supplied encoding information 92, and supplies it. Like described, for example, in the first embodiment, the cache configuration control unit 20 is configured to include an intra macro block ratio calculation unit 11. The unit 20 analyzes the supplied intra/inter macro block information 93, calculates an intra macro block ratio 97, and changes the configuration of the cache based on this. Like described, for example, in the second embodiment, the cache configuration control unit 20 is configured to include an MV variance calculation unit 12, analyzes the supplied MV information 94, calculates an MV variation 98, and changes the configuration of the cache based on this. Operations of the motion image decoding processing unit 4 receiving the stream 91 supplied thereto are the same as those of the motion image decoding processing unit 4 of the embodiments 1 and 2.

As a result, the cache configuration control unit 20 can appropriately change the configuration of the cache, using the encoding information as that of a target picture to be decoded by the motion image decoding processing unit 4. That is, it is possible to independently perform the decoding process in the motion image decoding processing unit and the extraction process for the feature amount in the to-be-decoded image analyzing unit. Thus, the configuration of the cache memory is dynamically controlled based on the feature amount extracted from the target picture itself to be decoded, thereby further improving the utilization efficiency of the cache memory.

Fifth Embodiment

<Another Embodiment>

Accordingly, the embodiments 1 to 4 have so far been described with reference to various examples, and various changes may possibly be made thereto without departing from the scope thereof.

Figure 10:
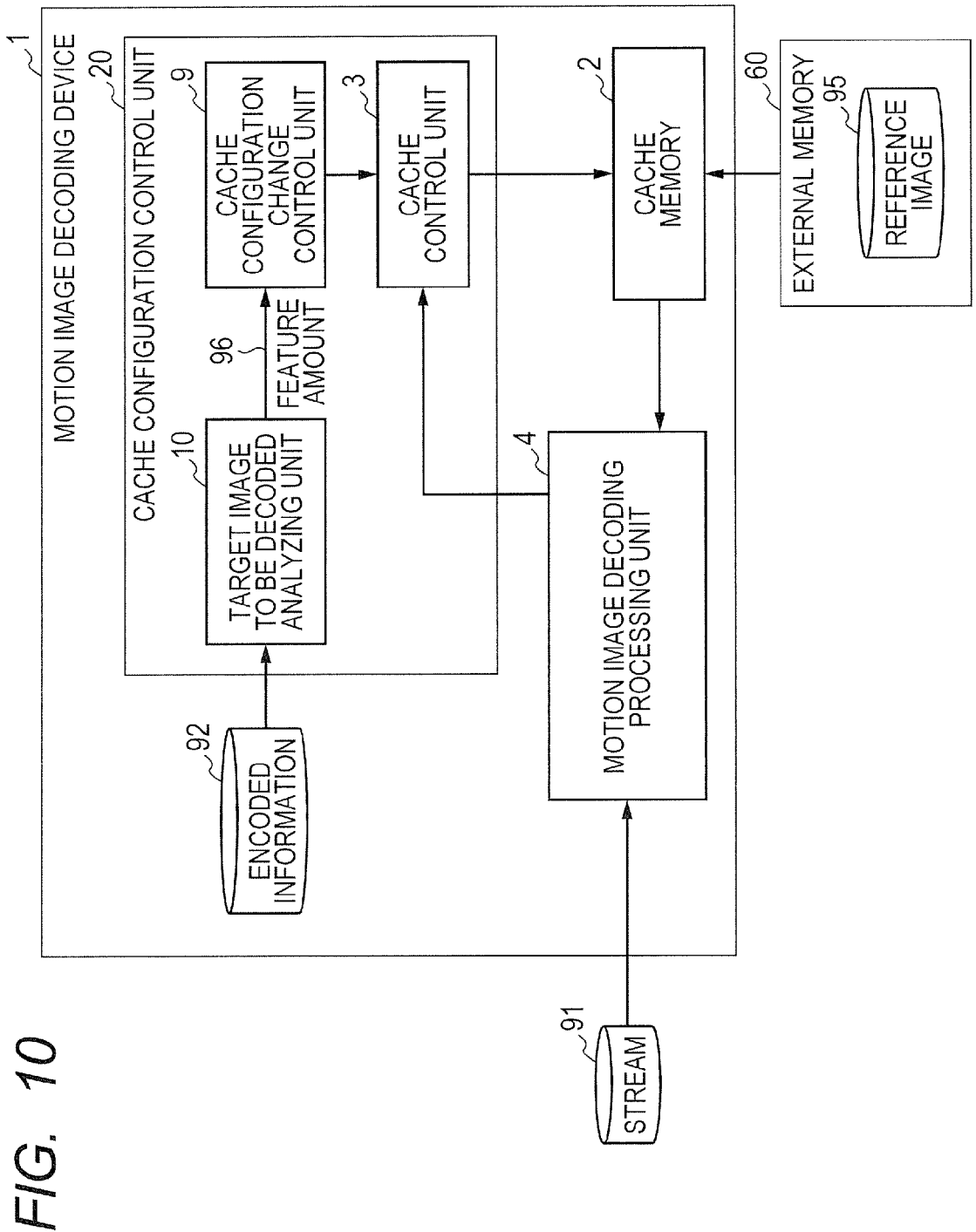
FIG. 10 is a block diagram illustrating a configuration example of a motion image decoding device of a fifth embodiment.

FIG. 10 is a block diagram illustrating a configuration example of a motion image decoding device of a fifth embodiment. A motion image decoding device 1 includes a motion image decoding processing unit 4 receiving a stream 91 input thereto and a cache memory 2 temporally storing data to be stored in an external memory 60, extracts a feature amount from a target image in a stream 91 to be decoded by the motion image decoding processing unit 4, and changes a read size of a cache fill from the external memory 60 to the cache memory 2 based on the extracted feature amount 96. FIG. 10 illustrates the motion image decoding device 1 having a cache configuration control unit 20 mounted therein. This unit 20 includes a to-be-decoded image analyzing unit 10 receiving encoding information 92 input thereto and outputting the feature amount, a cache configuration change control unit 9 changing a read size for the cache memory 2 based on the feature amount, and a cache control unit 3. When the motion image decoding processing unit 4 requests the cache control unit 3 for a reference image, the cache control unit 3 determines whether a cache hit or error has occurred. When a cache error has occurred, the unit performs cache fill for the cache memory 2, based on the read size specified by the cache configuration change control unit 9.

As a result, when the motion image decoding processing unit reads the reference image stored in the external memory through the cache memory, it is possible to reduce the unnecessary cache fill for the cache memory, thus improving utilization efficiency of the cache memory. The amount of the reference image to be filled in the cache is optimized, thereby reducing the cache error.

When a cache error has occurred at the time of reading the reference image in the decoding of a particular macro block, at the cache fill for reading this reference image, the size of a cache fill is optimized based on the feature amount. When the feature amount represents that there is a high possibility that the reference image to be referred for a target macro block to be decoded next is adjacent to the corresponding reference image, the size of the cache fill is increased, thereby enabling to improve the hit ratio of the cache memory in a decoding process for the target following macro blocks. On the contrary, when the feature amount represents that there is a low possibility that the reference image to be referred for a target macro block to be decoded next is adjacent to the corresponding reference image, the size of the cache fill is decreased, thereby enabling to suppress the unnecessary cache fill, that is, to suppress a high possibility of a cache error in a decoding process for the target following macro blocks.

The first embodiment adopts the intra macro block ratio 97 in the entire macro blocks of one picture, as the feature amount 96. As one example of the to-be-decoded image analyzing unit 10, the intra macro block ratio calculation unit 11 is included. The intra macro block ratio calculation unit 11 extracts the intra macro block ratio 97 from the intra/inter macro block information 93 as an example of the encoding information 92. The cache configuration change control unit 9 decreases the read size for the cache memory 2, as the intra macro block ratio 97 is high, and increases the read size, as the intra macro block ratio 97 is low. The cache configuration change control unit 9, in FIG. 1, is configured with the cache line control unit 8, the address control unit 5, the tag comparison control unit 6, and the read command control unit 7.

In a picture with a high ratio of macro blocks for intra prediction, the accessing frequency for the reference image by the motion image decoding processing unit is low. Thus, by decreasing the line size of the cache memory, it is possible to suppress the unnecessary cache fill, that is, to suppress the high possibility of causing a cache error in the decoding process for the target following macro blocks. At this time, the cache memory is configured to be able to cache many entries, thus improving the hit ratio entirely in the picture. On the other hand, in a picture with a low ratio of macro blocks for intra prediction, the accessing frequency for the reference image by the motion image decoding processing unit is high. Thus, by increasing the line size of the cache memory, it is possible to improve the hit ratio of the cache memory in the decoding process for the target following macro blocks.

The second embodiment adopts the variation of the motion vectors (MV variation) 98, as a feature amount 96. As an example of the to-be-decoded image analyzing unit 10, the MV variance calculation unit 12 is included. The MV variance calculation unit 12 extracts the MV variation 98 from the MV information 94 as an example of the encoding information 92. The cache configuration change control unit 9 decreases the read size for the cache memory 2, as the MV variation 98 is large, and increases the read size, as the MV variation 98 is small. In FIG. 5, the cache configuration change control unit 9 is configured with the cache line control unit 8, the address control unit 5, the tag comparison control unit 6, and the read command control unit 7.

In a picture where the variation of the motion vectors is small, the read size at the cache fill is increased, thereby enabling to improve the hit ratio of the cache memory in the decoding process for the target following macro blocks. In a picture where the variation of the motion vectors is large, the read size at the cache fill is decreased, thereby enabling to suppress the unnecessary cache fill, that is, to suppress a high possibility of causing the cache error in the decoding process for the target following macro blocks.

At this time, as described with reference to, for example, FIG. 7, one configuration example of the MV variance calculation unit 12 divides the reference image corresponding to the to-be-decoded image into a plurality of areas based on the direction and the distance centrally about the to-be-decoded macro block, counts the number of motion vectors specifying the areas to measure the frequency distribution, and extracts the MV variation 98 as a feature amount 96 based on the frequency distribution.

As a result, the variation of the motion vectors can easily be calculated without using a complicated arithmetic operation, such as multiplication.

The third embodiment is an example of the motion image decoding processing unit 4 including the variable length encoding processing unit 41 and the image signal processing unit 42, operating with a pipeline in the unit of one picture. The to-be-decoded image analyzing unit 10 extracts the feature amount 96 from the decoded result of the variable length encoding processing unit 41, while the image signal processing unit 41 performs a decoding process for the decoded result of the variable length encoding processing unit 42.

It is possible to independently perform the decoding process in the motion image decoding processing unit and the extraction process of the feature amount in the to-be-decoded image analyzing unit. Thus, based on the feature amount extracted from the target picture itself to be decoded, the configuration of the cache memory is dynamically controlled, thereby enabling to improve the utilization efficiency of the cache memory.

At this time, like the first embodiment, the to-be-decoded image analyzing unit 10 may be used as the intra macro block ratio calculation unit 11, and the intra macro block ratio 97 may be used as the feature amount 96. Like the second embodiment, the to-be-decoded image analyzing unit 10 may be used as the MV variance calculation unit 12, and the MV variation 98 may be used as the feature amount 96 or any other feature amount.

The fourth embodiment is an example in which the encoding information 92 is supplied from the additionally included motion image encoding unit 70 parallelly to the stream 91, instead of the motion image decoding processing unit 4. The to-be-decoded image analyzing unit 10 extracts the feature amount 96 from the encoding information 92 supplied by the motion image encoding unit 70.

As a result, like the case of the above-described third embodiment, it is possible to independently perform the decoding process in the motion image decoding processing unit and the extraction process for the feature amount in the to-be-decoded image analyzing unit. Thus, the configuration of the cache memory can dynamically be controlled, based on the feature amount extracted from the target picture itself to be decoded, thereby enabling to improve the utilization efficiency of the cache memory.

At this time, like the first embodiment, the to-be-decoded image analyzing unit 10 may be used as the intra macro block ratio calculation unit 11, and the intra macro block ratio 97 may be used as the feature amount 96. Like the second embodiment, the to-be-decoded image analyzing unit 10 may be used as the MV variance calculation unit 12, and the MV variation 98 may be used as the feature amount 96 or any other feature amount.

The feature amount 96 is not necessarily parameters defined in the unit of one picture. For example, parameters may be an accumulation of a plurality of pictures, instead of the parameters extracted from one picture. Instead of changing the cache configuration with reference to the reference image in this decoding process, based on the feature amount of a picture one before the target picture to be decoded, the configuration of the cache is changed using accumulated information up to the picture. As a result, when a tendency extremely changes in the unit of pictures, sensitive reactions can be suppressed. This results in a preferable value as a prediction value of the feature amount of the current target picture to be decoded.

The feature amount 96 is defined in each divided area of one picture. The cache configuration may be changed in accordance with it.

Figure 11:
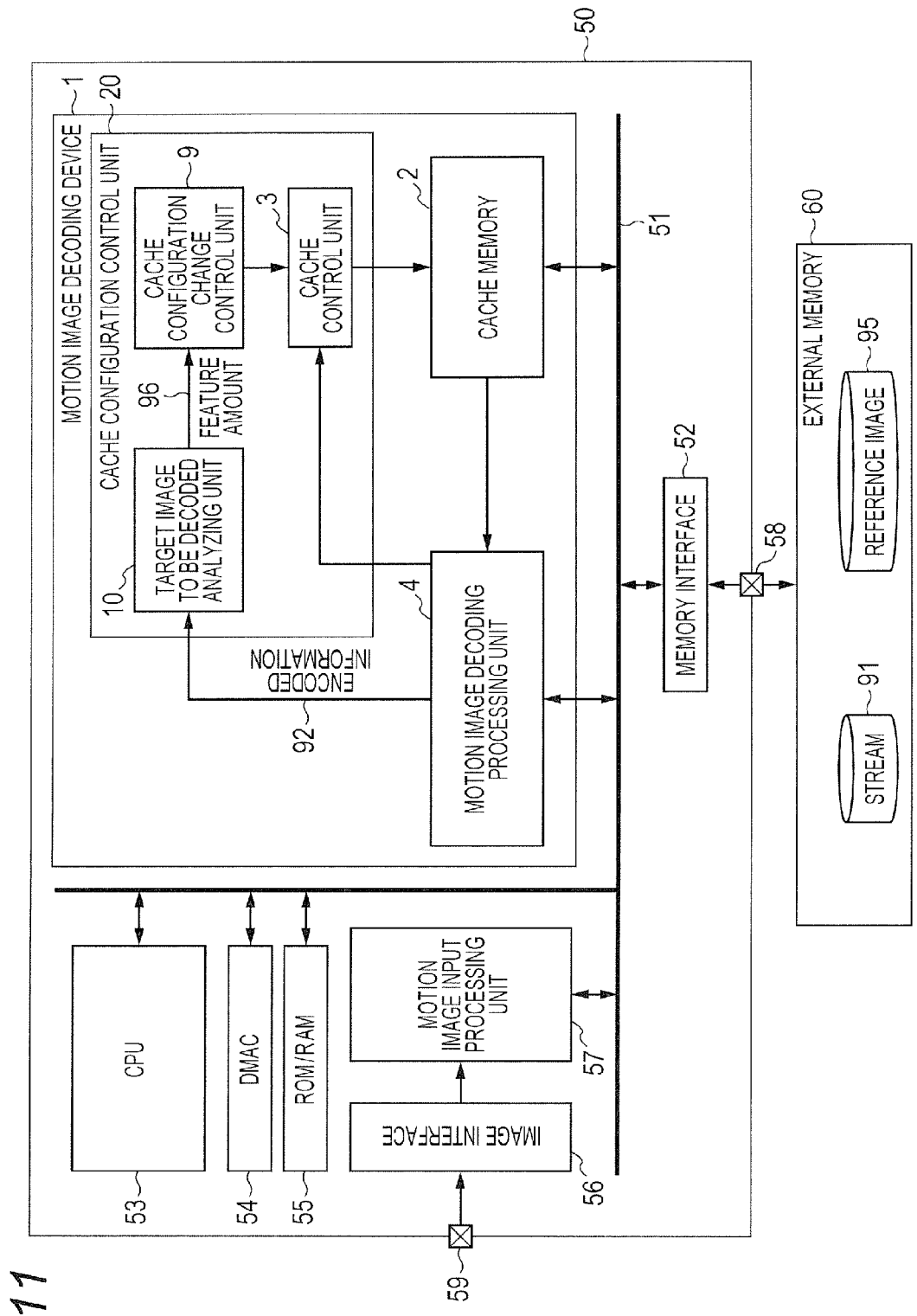
FIG. 11 is a block diagram illustrating a configuration example of an LSI (Large Scale Integration Circuit) in which a motion image decoding device is mounted.

FIG. 11 is a block diagram illustrating a configuration example of an LSI in which a motion image decoding device is mounted. An LSI 50 includes a motion image decoding device 1, a bus 51, a memory interface 52, a CPU 53, a DMAC 54, a ROM/RAM 55, an image interface 56, a motion image input processing unit 57, and terminals 58 and 59. Though no particular limitations are made, the LSI 50 is formed on a single semiconductor substrate, such as silicon, using a manufacturing technique for well-known CMOS (Complementary Metal-Oxide-Semiconductor field effect transistor) semiconductors. The bus 51 couples functional modules to each other. The CPU 53 stands for a Central Processing Unit, executes programs supplied from the ROM/RAM 55, thereby controlling the LSI 50 entirely. The DMAC 54 stands for Direct Memory Access Controller. Its parameters are set in advance by the CPU 53, thereby transferring data executed in the background under the execution of the program by the CPU 53. The ROM/RAM 55 stands for Read Only Memory/RandomAccess Memory. The ROM holds program codes supplied to the CPU 53 and constant parameters, while the RAM is used as a work memory. The image interface 56 is an interface for transmitting image data externally input through the terminal 59 to the motion image input processing unit 57. The external memory 60 can be coupled to the terminal 58 of the LSI 50. The coupled external memory 60 can be accessed through the memory interface 52. The motion image decoding device 1 includes the cache configuration control unit 20, the motion image decoding processing unit 4, and the cache memory 2. The unit 20 includes the to-be-decoded image analyzing unit 10, the cache configuration change control unit 9, and the cache control unit 3. As described with reference to FIG. 10, the motion image decoding device 1 may be employed by various examples.

The stream 91 is generated by the image interface 56 and the motion image input processing unit 57 from the image data input from, for example, the terminal 59. The stream 91 is stored in the external memory 60 through the memory interface 52, and read and supplied from the external memory 60 again into the motion image decoding processing unit 60 in the motion image decoding device 1. The reading of the stream 91 from the external memory 60 is performed, for example, by the DMAC 54 in the background of the program process using the CPU 53, in response to a request from the motion image decoding processing unit 4. As a result of the decoded result in the motion image decoding processing unit 4, a decoded image to be generated is written into the external memory 60 through the bus 51 and the memory interface 52, and referred as the reference image in a decoding process for following pictures. The request for the reference image 95 to the cache memory 2 by the motion image decoding processing unit 4 and the writing (cache fill) to the cache memory 2 from the external memory 60 at the occurrence of a cache error are as described with reference to FIG. 10.

When the motion image decoding processing unit 4 reads the reference image 95 stored in the external memory 60 through the cache memory 2, it is possible to reduce the unnecessary cache fill for the cache memory 2 and to improve utilization efficiency of the cache memory 2. This results in reducing the traffic of the bus 51. Therefore, it is possible to effectively improve the performance on program execution by the CPU 53.

The above-described configuration of the LSI 50 is simply an example, and various changes can be made thereto. For example, in place of the image interface 56 and the motion image input processing unit 57, it is possible to include a communication interface in which the stream 91 is included in packets. The bus 51 may be hieratically formed, or may include a plurality of CPUs. The motion image encoding unit may be mounted in the same chip together.

Accordingly, the present invention made by the present inventors have specifically been described based on the embodiments. The present invention is not limited to these. Needless to say, various changes may be thereto without departing from the scope thereof.

For example, names of the functional blocks are given to represent functions of the respective functional blocks, while division and integration of the blocks are arbitrary.

What is claimed is:

1. An image processing device comprising:
    a motion image decoding processing unit to which a stream is input;
    a cache memory which temporarily stores data stored in an external memory;
    a cache control unit;
    a to-be-decoded image analyzing unit;
    an address control unit which outputs a request address in response to a request from the motion image decoding processing unit;
    a tag comparison control unit which has a tag memory;
    a read command control unit; and
    a cache line control unit, and
    wherein the to-be-decoded image analyzing unit extracts a feature amount of a target image to be decoded by the motion image decoding processing unit, from the stream,
    wherein the cache line control unit specifies a read size from the external memory to the cache memory, for the read command control unit, based on the feature amount,
    wherein the tag comparison control unit compares the request address and tag data held in the tag memory, and determines whether a cache hit or error has occurred,
    wherein, when the cache hit has occurred, the cache control unit reads data corresponding to the request address, and supplies the data to the motion image decoding processing unit, and
    wherein, when the cache error has occurred, the cache control unit reads data regarding a read size specified by the read command control unit from the external memory, and writes the data to the cache memory.

2. The image processing device according to claim 1,
    wherein the to-be-decoded image analyzing unit extracts an intra macro block ratio in entire macro blocks of one picture in the to-be-decoded image, as the feature amount, and
    wherein the cache line control unit decreases the read size, as the intra macro block ratio is high, and increases the read size, as the intra macro block ratio is low.

3. The image processing device according to claim 1,
    wherein the to-be-decoded image analyzing unit extracts a motion vector variation of one picture in the to-be-decoded image, as the feature amount,
    wherein the cache line control unit decreases the read size, as the motion vector variation is large, and increases the read size, as the motion vector variation is small.

4. The image processing device according to claim 3,
    wherein the to-be-decoded image analyzing unit divides a reference image corresponding to the to-be-decoded image into a plurality of areas based on a direction and a distance centrally about a target macro block to be decoded, measures a frequency distribution of motion vectors specifying the areas, and extracts the feature amount based on the frequency distribution.

5. The image processing device according to claim 1,
    wherein the motion image decoding processing unit includes a variable length encoding processing unit and an image signal processing unit performing a decoding process for a decoded result of the variable length encoding processing unit,
    wherein the variable length encoding processing unit and the image signal processing unit operate with a pipeline in unit of one picture,
    wherein the to-be-decoded image analyzing unit extracts the feature amount from the decoded result of the variable length encoding processing unit, and
    wherein the address control unit outputs the request address corresponding to a request from the image signal processing unit.

6. The image processing device according to claim 1,
    wherein the image processing device further includes encoding information processing unit to which encoding information corresponding to the stream is input,
    wherein the to-be-decoded image analyzing unit extracts the feature amount from the encoding information supplied through the encoding information processing unit.

7. The image processing device according to claim 6,
    wherein the image processing device further includes a motion image encoding unit, and
    wherein the motion image encoding unit supplies a stream generated by performing an encoding process for a motion image to the motion image decoding processing unit, and supplies encoding information in the encoding process to the encoding information processing unit.

8. The image processing device according to claim 5,
    wherein the to-be-decoded image analyzing unit extracts an intra macro block ratio of entire macro blocks of one picture in the to-be-decoded image, as the feature amount, and
    wherein the cache line control unit decreases the read size, as the intra macro block ratio is high, and increases the read size, as the intra macro block ratio is low.

9. The image processing device according to claim 5,
    wherein the to-be-decoded image analyzing unit extracts a motion vector variation of one picture in the to-be-decoded image, as the feature amount, and
    wherein the cache line control unit decreases the read size, as the motion vector variation is large, and increases the read size, as the motion vector variation is small.

10. A semiconductor device:
    a motion image decoding processing unit;
    a cache memory; and
    a cache configuration control unit, and the device being couplable to an external memory, and
    wherein the cache configuration control unit includes a to-be-decoded image analyzing unit, a cache configuration change control unit, and a cache control unit,
    wherein the motion image decoding processing unit reads a stream from the external memory, performs a decoding process for the read stream, and writes a decoded image generated by the decoding process to the external memory, wherein the to-be-decoded image analyzing unit extracts a feature amount of a target image to be decoded by the motion image decoding processing unit, from the stream, and wherein the cache configuration change control unit specifies a read size at time of a cache error of the cache memory, for the cache control unit, based on the feature amount.

11. The semiconductor device according to claim 10,
wherein the to-be-decoded image analyzing unit extracts an intra macro block ratio of entire macro blocks of one picture in the to-be-decoded image, as the feature amount, and the cache configuration change control unit decreases the read size, as the intra macro block ratio is high, and increases the read size, as the intra macro block ratio is low.

12. The semiconductor device according to claim 10,
wherein the to-be-decoded image analyzing unit extracts a motion vector variation of one picture in the to-be-decoded image, as the feature amount, and wherein the cache configuration change control unit decreases the read size, as the motion vector variation is large, and increases the read size, as the motion vector variation is small.

13. The semiconductor device according to claim 10,
wherein the motion image decoding processing unit includes a variable length encoding processing unit and an image signal processing unit, wherein the variable length encoding processing unit and the image signal processing unit operate with a pipeline in unit of one picture, wherein the to-be-decoded image analyzing unit extracts the feature amount from a decoded result of the variable length encoding processing unit, and wherein the image signal processing unit performs a decoding process for the decoded result of the variable length encoding processing unit.

14. The semiconductor device according to claim 10,
wherein the semiconductor device further includes an encoding information processing unit to which encoding information corresponding to the stream is input, and wherein the to-be-decoded image analyzing unit extracts the feature amount from the encoding information supplied through the encoding information processing unit.

15. The semiconductor device according to claim 14,
wherein the semiconductor device further includes a motion image encoding unit which encodes a motion image to generate the stream and the encoding information.

16. An image processing device comprising:
a motion image decoding processing unit to which a stream is input; and a cache memory which temporarily stores data stored in an external memory, and wherein the motion image decoding processing unit extracts a feature amount from a target image in the stream to be decoded, and changes a read size of a cache fill from the external memory to the cache memory, based on the feature amount.

17. The image processing device according to claim 16,
wherein the motion image decoding processing unit extracts an intra macro block ratio in entire macro blocks of one picture in a target image in the stream to be decoded, as the feature amount, decreases the read size, as the intra macro block ratio is high, and increases the read size, as the intra macro block ratio is low.

18. The image processing device according to claim 16,
wherein the motion image decoding processing unit extracts a motion vector variation of one picture in a target image in the stream to be decoded, as the feature amount, decreases the read size, as the motion vector variation is large, and increases the read size, as the motion vector variation is small.

19. The image processing device according to claim 16,
wherein the motion image decoding processing unit includes a variable length encoding processing unit and an image signal processing unit with a pipeline in unit of one picture, wherein the image processing device extracts the feature amount from a decoded result of the variable length encoding processing unit, and wherein the image signal processing unit performs a decoding process for the decoded result of the variable length encoding processing unit.

20. The image processing device according to claim 16,
wherein information corresponding to the stream is supplied to the image processing device, and wherein the image processing device extracts the feature amount from the supplied encoding information.

* * * * *